Nov. 3, 1925.

T. MIDGLEY 1,559,972

METHOD AND APPARATUS FOR BUILDING TIRE CASINGS

Filed Jan. 28, 1920      2 Sheets-Sheet 1

INVENTOR
Thomas Midgley
BY
Franklin G. Neal
ATTORNEY

Patented Nov. 3, 1925.

1,559,972

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

METHOD AND APPARATUS FOR BUILDING TIRE CASINGS.

Application filed January 28, 1920. Serial No. 354,622.

*To all whom it may concern:*

Be it known that I, THOMAS MIDGLEY, residing at Hampden, county of Hampden, State of Massachusetts, have invented certain new and useful Improvements in Methods and Apparatus for Building Tire Casings, of which I declare the following to be a full, clear, and exact description.

The present invention relates to a method and an apparatus for building tire casings.

It has for its object a method and an apparatus which will facilitate the building of tire casings, and which will improve the quality of the product. The specific manner in which these objects are attained, as well as the relation of the invention to other and subsidiary objects, will appear from the ensuing description and the appended claims.

In the manufacture of tire carcasses, it is the customary practice to mount upon an annular core a band of one or more plies of rubberized fabric, which is then "stitched" down upon the sides of the core by means of a rotatable roller which travels in a spiral path over the fabric. The band of fabric is usually stretched longitudinally a considerable amount before or during its application to the core, such stretch usually amounting to from 10% to 18% of the length of the band. As is well understood, the fabric is shaped to the sides of the core by lateral stretching and by some "fulling" or puckering of the fabric. The lateral stretch causes the fabric to contract lengthwise and thus to conform to the gradually decreasing circumferential length of the sides of the core. In the usual method of applying fabric to a core the lateral stretch is accomplished by the stitching roller at the same time that the fabric is pressed into contact with the core or the previously laid plies, and the instantaneous adhesion of successive plies due to the tackiness of the rubber prevents any considerable stretching in this direction. For this reason it has always been necessary, in order to avoid undue fulling of the fabric near the lower sides of the core, to give the fabric the above-mentioned longitudinal stretch just before it is applied to the core, relying upon the shrinking of the rubber when the tension is removed to assist in fixing it to the core.

The combination of longitudinal and lateral stretch has been found disadvantageous in several respects. It is almost impossible to secure a uniform longitudinal stretch; this being particularly true where the fabric is fed tangentially to the core, as the first six or eight inches are frequently practically untensioned. Furthermore, the tensioning of the fabric longitudinally to any considerable degree necessitates special mechanism or great care to secure satisfactory results. The combination of tensions has a further disadvantage in that the strain resisting elements do not follow the path of shortest distance between their ends. At some point on the side of the core the lengthwise contraction due to the lateral stretch will neutralize the original longitudinal stretch. At this point it has been found that the strain resisting elements, beside passing from a positive to a negative stage of longitudinal tension, are frequently distorted out of their normal path due to the combination of the condition of no longitudinal tension with various other influences such as the lateral stretching force and the adhesion of the rubber in adjacent plies.

In the usual method of stitching, by the use of rollers passing in a spiral manner down the sides of the core, it is impossible to secure sufficient lateral tension to shape the fabric to the core without a preliminary longitudinal stretch. The same is true of any other method of shaping of which I am aware. This is largely due to the fact that the stitching rolls press the fabric against the core at the same time that they stretch it, the adhesiveness of the rubber anchoring the plies together before any substantial lateral stretch can be secured.

My invention is intended in part to obviate the difficulties recited above, although it should be clearly understood that its utility is not limited to cases where the fabric has not been given an initial longitudinal stretch. My invention is further intended to do away with the crushing and distorting pressure of the stitching means now in use, and to further prevent distortion by exerting the lateral stretching force simultaneously throughout a circumference of the core and in a radial direction. The invention further contemplates the lateral stretching of the fabric before it is pressed into contact with the core or into contact with the plies previously laid thereon. It still further contemplates thoroughly pressing the fabric against the core or the previously laid plies as soon as it comes into contact therewith, and holding it so pressed while the portions of the fabric still out of contact with the core are being laterally stretched. It still further contemplates the laying on of the tire building material in the absence of abrasion by the stitching means. The invention, however, is not restricted to the simultaneous fulfillment of all these purposes, but is directed to them singly or in combination, or in combination with other steps or purposes; all as more specifically set forth in the appended claims.

Briefly stated, the invention in the preferred embodiment illustrated in the drawings consists in placing a layer of tire building material which may be composed of one or more plies of fabric, the uncured rubber tread, or the tread combined with the sidewalls, about the periphery of a core, the fabric, if this is the material being applied, being preferably, but not necessarily, in a substantially unstretched condition longitudinally. The core with the layer thereon is then positioned within suitable means such as an annular air bag from which the air has been exhausted, by which the outstanding skirts or side portions of the fabric layer may be pressed against the sides of the core. An air bag is preferable for this purpose as it furnishes a convenient means by which a yielding or fluid pressure can be exerted simultaneously throughout a circumference of the core. This means is then contracted upon the core, forcing the fabric down upon the sides of the core and pressing it firmly into contact therewith. Preferably the sides or skirts of the fabric layer are supported during this operation by walls spaced from the core, upon which the air bag may press the fabric to insure that the latter will be stretched between the supports and the core.

The invention will now be described with particular reference to the apparatus shown in the accompanying drawings, in which—

Figure 1:
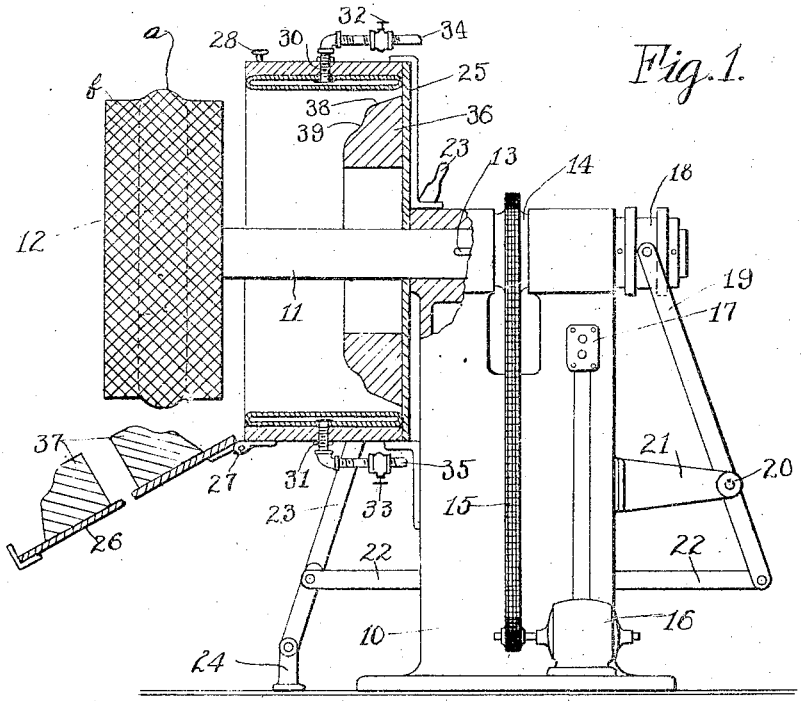
Fig. 1 is a side elevation, partly in section, of a device by which the method involved in my invention may be carried out.

The apparatus, in the embodiment shown, which may be varied in its details without departing from the invention, comprises a supporting frame 10 on which is journaled for both reciprocation and rotation a shaft 11 carrying a core 12 which may be of any usual form and which may be supported on the shaft in any customary or desired way. The shaft is slidingly keyed as at 13 to a pulley 14 which is driven by a belt or chain 15 from a motor 16 controlled by a suitable switch 17. A grooved collar 18 is secured to the shaft and is adapted to receive a shipper 19 pivoted at 20 to a bracket 21 on the frame and operable through a link 22 by a hand lever 23 or other suitable mechanism. By moving handle 23, which as shown is pivoted to a stationary support at 24, the shaft 11 and the core carried thereby can be shifted axially without affecting their rotation.

Surrounding the shaft 11 and positioned to inclose the core when the latter is moved to its right hand limit of axial motion is a box 25 provided with a door 26 pivoted at 27 or movable in any other suitable manner. The door may be secured to the box when in its closed position in any suitable manner, as by a latch 28. Arranged inside the box and entirely surrounding the core is an annular expansible member operable by fluid pressure, such as air. Preferably this member takes the form of an elastic air bag 29, provided with an inlet 30 and an outlet 31 controlled by valves 32 and 33 respectively, whereby the bag may be connected with either a pipe 34 leading to a source of air under pressure, or a pipe 35 leading to suitable means for producing a vacuum. Mounted on the inside surfaces of the box 25 and door 26 respectively are supports 36 and 37 serving to hold in position the skirts or sides of the fabric. These supports have a relatively flat top 38 merging into sides 39 substantially parallel to the sides of the core, and are cut away at 40 to give space for the beads. Between the supports and the core is a space 41 in which the air bag acts. In applying a tread, or other layer where lateral stretching is not important, it may be found desirable to omit these supports.

Figure 2:
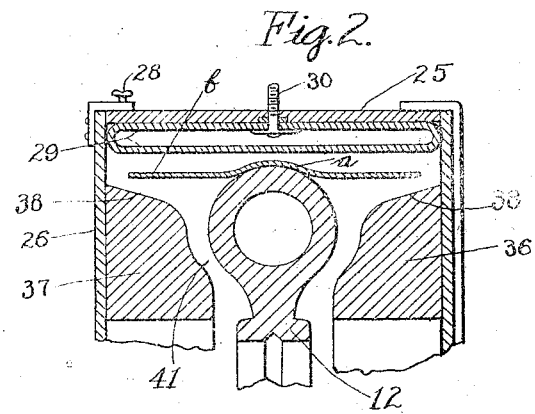
Fig. 2 is a partial section thereof showing a second stage in the operation.
Figure 3:
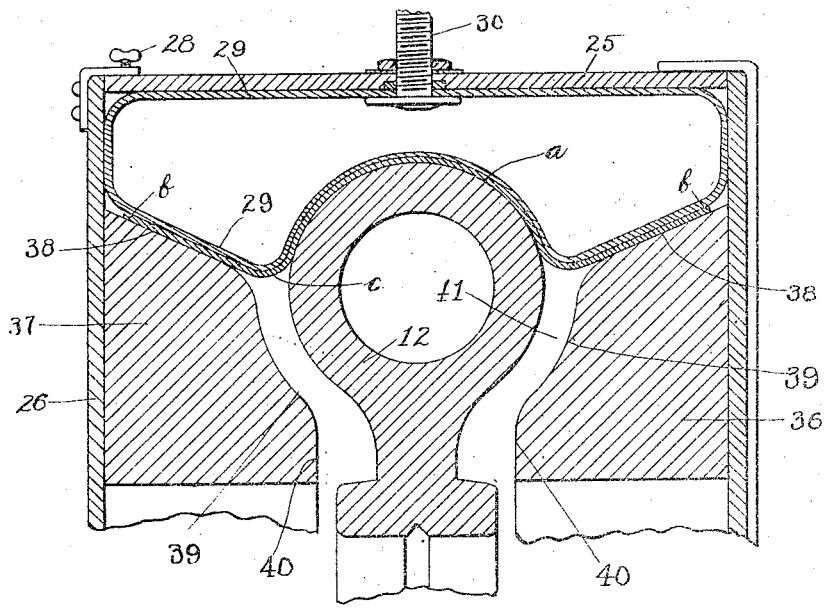
Fig. 3 is a view similar to Fig. 2 showing the fabric partially stitched down upon the core.
Figure 4:
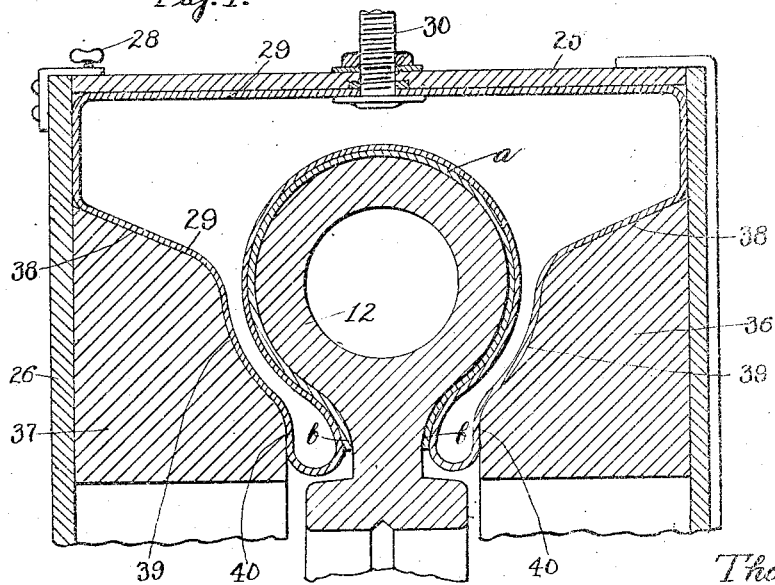
Fig. 4 is a similar view showing a still further stage.

By the use of the above apparatus the method of building a carcass forming a part of my present invention may be carried out as follows. A fabric layer $a$, composed of square-woven fabric, cord fabric, or other material, and formed in one or more layers, is laid about the periphery of the core, preferably, though not necessarily without substantial circumferential tension. In Figs. 1 and 2 the fabric has been shown under a slight circumferential tension, but this may be increased or decreased as desired. The full advantage of my method will be obtained, however, in cases where the circumferential tension is reduced to the minimum necessary to cause the fabric to lay smoothly along the crest of the core. The fabric may be applied to the core by drawing it tangentially thereon, or may be formed as a pocket or endless band and thereafter fitted over the crest of the core. The core is then rotated by motor 16, causing the sides or skirts $b$ of the fabric to stand out by centrifugal force substantially in the form of a cylinder. The core is then shifted axially by means of handle 23 and connected elements, the cylindrical form imparted by the rotation causing the skirts to lie smoothly around the support 36. With the core still rotating, door 26 is closed, the support 37 sliding within the skirt of the fabric. The core is now stopped and air under pressure admitted through valve 32. This expands the air bag and causes it to stretch the fabric down upon the sides of the core as shown successively in Figs. 2, 3, and 4. Valve 32 is then closed and valve 33 opened, connecting the bag to an exhausting mechanism and causing it to assume a flat form like that in Figs. 1 and 2. The sequence of operations may be repeated to build up the desired number of plies of fabric upon the core. Bead members of any suitable form may be added as desired. The air bag will apply those plies located outside the bead member in the same way as those inside, cut away portions 40 being provided to allow for increased thickness at these points. A similar procedure will be followed in applying a tread, or a tread and side walls.

The action of the air bag in shaping the fabric to the sides of the core deserves especial attention. It will be apparent that pressure will be exerted simultaneously throughout a circumstance of the core and in a general radial direction. By stating that pressure is exerted simultaneously throughout a circumference of the core I refer to the fact that the application of the fabric occurs simultaneously all the way around the core and proceeds down the core progressively, the bag closing down on the sides of the core in a manner very similar to that of an iris diaphragm. This is important in equalizing the pressure and tension throughout the fabric, and in preventing the application of some of the elements causing shifting of circumferentially adjacent elements out of their true relation. The radial direction of the pressure is of advantage in that the fabric is stressed during the building operation in the same direction in which it will be stressed when the tire is inflated. Both of these points find their chief importance in the improvement in the quality of the product.

Another important function of the air bag is to give to the fabric a lateral stretch before it is applied to the core by restraining or holding the sides of the fabric and simultaneously forcing the fabric between the restrained portion and the core inwardly and into contact with the sides of the core. This is accomplished by the air bag pressing the skirt $b$ against portions 38 and 39 of the supports, the friction of the fabric on the support serving to restrain or hold it with considerable force. This friction can be regulated by varying the material of which the supports 36 and 37 are made, or by placing suitable anti-friction rollers or balls on the supports. I prefer, however, to form the supports of maple wood, as this gives a very uniform friction with rubberized fabric. This restraining of the skirts of the fabric layer serves to compel a considerable lateral stretch before the fabric comes into contact with the core or the previously applied plies of fabric due to the pressure of the air bag at the point $c$. Thus I avoid the difficulty of securing an adequate lateral stretch which is inherent in the usual methods, in which all the stretching that occurs is practically simultaneous with the contact of the fabric layers with the core. In the old method the adherence of the fabric to the core or the previously laid fabric prevents any real stretching being done without a resultant distortion of the fabric. By the use of the apparatus described the stretching of the fabric is accomplished before it comes in contact with the core, and consequently any desired stretch may be obtained by varying the frictional resistance as described and by changing the air pressure or the rapidity with which the air pressure is applied.

The material is applied simultaneously throughout a circumference of the core in a manner that may be described as a radial rolling or vertical action. It is well recognized that in adhesively securing one sheet of material to another the best contact is had if the first sheet is mounted on a curved surface and is rolled from that surface onto that to which it is to be adhesively connected. The air bag carries the layer of material against the core in exactly the same manner, insuring close contact throughout the entire surface of the core with the material in a properly stretched condition. The motion of the tire building material as it is forced against the core by the air bag is almost the same as the motion of a vortex ring. In each case there is a motion radially inwardly combined with a decrease in circumference; the latter being attained in the vortex ring by a circumferential condensation, and in the present case by a lateral stretch. This radially rolling vertical method of applying the material has never before been accomplished and is of importance in laying the material upon the sides of the core with great smoothness.

The use of the air bag accomplishes the further purpose of compacting the layers of fabric or other material together after they have been laid upon the core and holding them compacted through the operation of stretching the unapplied portion of the fabric. This not only prevents displacement of the fabric after it is in position but avoids to a large extent the trouble sometimes experienced of the fabric plies separating during vulcanization due to the formation of air bubbles at points between the successive convolutions of the spiral path followed by the usual roller. The pressure exerted acts progressively down the side of the core on every point thereof instead of acting only at points on the successive convolutions of a spiral, is yielding and adaptable to the surface of the core, and will thoroughly compact the fabric layers without danger of crushing. In the usual method the only compacting that occurs is done with the relatively sharp and unyielding edge of the stitching roll. A further advantage of a similar nature is that the pressure exerted by the air bag lasts through a considerable period of time, giving the rubber time to adapt itself to its new position and to adhere firmly to the previous layers. It is well known that uncured rubber takes some time to flow and become set, and the customary method of stitching with a roller does not furnish pressure for a sufficient time to thoroughly unite the layers. This defect is remedied by the present method.

While the invention has especial utility in applying the fabric layers to the core in the building of a tire carcass, it also finds use in applying treads, or treads combined with side walls, or combined with both side walls and breaker, or in applying any desired combination of elements. In the following claims the term "tire building materal" has been used to include the various elements which may be used in connection with the method and apparatus. Also, and for want of a better term, the word "core" has been used as denoting the surface to which the tire building material is applied, although it will be understood that the actual surface may be that of previously applied layers of material.

It will be understood that modifications in the apparatus and method may be made without departing from the invention as set forth in the appended claims.

What I claim as new and desire to secure by Letters Patent is:

1. A method of building tire casings comprising placing about the periphery of a core a layer of tire building material, so as to form a band having its side portions of greater circumference than the bead portions of the tire, and shaping the side portions of the material down the sides of the core by fluid pressure acting simultaneously throughout a circumference and progressively down the sides thereof.

2. The method of building up tire casings comprising placing a layer of tire building material about the periphery of a core, and forcing the material into contact with the sides of the core by fluid pressure acting simultaneously throughout a circumference of the core, while restraining the sides of the material, whereby the material is stretched transversely between the core and the restrained portion.

3. The method of building up tire casings comprising placing a layer of tire building material about the periphery of a core, and forcing the material into contact with the sides of the core by fluid pressure acting simultaneously throughout a circumference of the core while restraining the sides of the material.

4. The method of building up tire casings comprising placing a layer of tire building material about the periphery of a core by fluid pressure acting simultaneously throughout a circumference of the core and progressively down the sides thereof while restraining the sides of the material.

5. The method of building tire carcasses comprising placing a layer of fabric about the periphery of a core, said fabric being substantially unstretched in a circumferential direction; and stretching said fabric layer laterally down upon the sides of the core, the stretching force being exerted in a direction radial of the core and simultaneously throughout a circumference of the core.

6. A device of the class described comprising an annular core adapted to support a layer of tire building material, an annular air bag surrounding the core, and supports spaced from the core for the sides of a layer of such material mounted on the core.

7. A device of the class described comprising an annular core adapted to support a layer of tire building material, an annular air bag surrounding the core, and supports spaced from the core for the sides of a layer of such material mounted on the core, said supports presenting a relatively flat top and conforming generally to the shape of the core.

8. A device of the class described comprising an annular core adapted to support a layer of tire building material, an annular air bag surrounding the core, and supports from the core for the sides of a layer of such material mounted on the core, said core and said supports being relatively movable.

9. A device of the class described comprising an annular core adapted to support a layer of tire building material, an annular air bag surrounding the core, supports spaced from the core for the sides of a layer of such material mounted on the core, said core and said supports being relatively movable in an axial direction, and means for rotating the core.

10. A device of the class described comprising a core adapted to support a layer of tire building material, means for axially reciprocating the core, means for rotating the core, an annular member extensible by fluid pressure and within which the core is adapted to be moved by its axial reciprocation, a support for one side of a layer of tire building material into adjacency with which the core is adapted to be moved by such reciprocation, and a second similar support adapted to be moved into adjacency with the core.

11. A device for conforming tire-building material to a core comprising an inflatable annular bag, a housing enclosing the bag forming with the core a chamber for controlling the expansion of the bag and causing the latter to press the tire-building material against the core, and means for exerting a dragging action on the material.

THOMAS MIDGLEY.